United States Patent
Kumar et al.

(10) Patent No.: US 11,763,589 B1
(45) Date of Patent: Sep. 19, 2023

(54) DETECTION OF BLANKS IN DOCUMENTS

(71) Applicant: Intuit Inc., Mountain View, CA (US)

(72) Inventors: Sricharan Kallur Palli Kumar, Mountain View, CA (US); Peter Anthony, Santa Clara, CA (US); Surendra Maharjan, Mountain View, CA (US); Deepankar Mohapatra, The Colony, TX (US); Conrad De Peuter, Mountain View, CA (US); Preeti Duraipandian, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/104,257

(22) Filed: Jan. 31, 2023

(51) Int. Cl.
*G06V 30/416* (2022.01)
*G06V 30/10* (2022.01)
*G06N 20/00* (2019.01)
*G06V 30/414* (2022.01)
*G06V 30/19* (2022.01)

(52) U.S. Cl.
CPC .......... *G06V 30/416* (2022.01); *G06N 20/00* (2019.01); *G06V 30/10* (2022.01); *G06V 30/414* (2022.01); *G06V 30/19147* (2022.01)

(58) Field of Classification Search
CPC .... G06V 30/10; G06V 30/414; G06V 30/416; G06V 30/19147; G06N 20/00
See application file for complete search history.

(56) References Cited

U.S. PATENT DOCUMENTS

| 10,482,174 | B1 * | 11/2019 | Goodsitt | G06V 10/82 |
| 2023/0014904 | A1 * | 1/2023 | Skiles | G06F 40/103 |
| 2023/0084845 | A1 * | 3/2023 | Lu | G06V 30/413 |
| 2023/0101817 | A1 * | 3/2023 | Sinha | G06F 16/41 |
| | | | | 707/722 |

OTHER PUBLICATIONS

Jayaraman (Computer English Translation of Australian Patent Publication No. AU 2019213434 A1), pp. 1-14. (Year: 2019).*

* cited by examiner

*Primary Examiner* — Daniel G Mariam
(74) *Attorney, Agent, or Firm* — Ferguson Braswell Fraser Kubasta PC

(57) ABSTRACT

A method of blank detection involves receiving a document from a user, where the document includes derived text; applying a trained blank detection model to the document to make a first prediction, where the first prediction indicates whether at least one field in the document is blank; comparing the first prediction with a second prediction, where the second prediction is made by an extraction model; and extracting the at least one field using the extraction model.

20 Claims, 5 Drawing Sheets

*Figure 4*

DETECTION OF BLANKS IN DOCUMENTS

BACKGROUND

Users are commonly interested in automatically seeing information from their documents extracted. Most commonly, documents include one or more fields that are present on the document so when the field is empty or missing, pre-existing systems can determine detection of blanks. These types of documents also have fields which are intentionally blank, and there is no text on the document whatsoever indicating that the space is left intentionally blank; the blank classification is meant to be interpreted as being so by the reader of the document.

SUMMARY

In general, in one or more aspects, the disclosure relates to a method of blank detection, the method comprising: receiving a document from a user, wherein the document comprises derived text; applying a trained blank detection model to the document to make a first prediction, wherein the first prediction indicates whether at least one field in the document is blank; comparing the first prediction with a second prediction, wherein the second prediction is made by an extraction model; and extracting the at least one field using the extraction model.

In general, in one or more aspects, the disclosure relates to a system for blank detection, the system comprising: a user device configured to store: a collection of one or more documents comprising at least one field, wherein the one or more documents are from a user; a cloud computing system configured to provide access to a repository storing the one or more documents; and a server communicatively connected to the cloud computing system and comprising one or more processors configured to execute instructions to: receive a document, wherein the document comprises derived text; apply a trained blank detection model to the document to make a first prediction, wherein the first prediction indicates whether the at least one field in the document is blank; compare the first prediction with a second prediction, wherein the second prediction is made by an extraction model; and extract the at least one field using the extraction model.

In general, in one or more aspects, the disclosure relates to a non-transitory computer-readable medium storing instructions executable by a processor to: receive a document from a user, wherein the document comprises derived text; apply a trained blank detection model to the document to make a first prediction, wherein the first prediction indicates whether at least one field in the document is blank; compare the first prediction with a second prediction, wherein the second prediction is made by an extraction model; and extract the at least one field using the extraction model.

Other aspects of the disclosure will be apparent from the following description and the appended claims.

BRIEF DESCRIPTION OF DRAWINGS

FIG. 4 shows a non-limiting example of a form used for blank detection in accordance with one or more embodiments.

DETAILED DESCRIPTION

Figure 1:
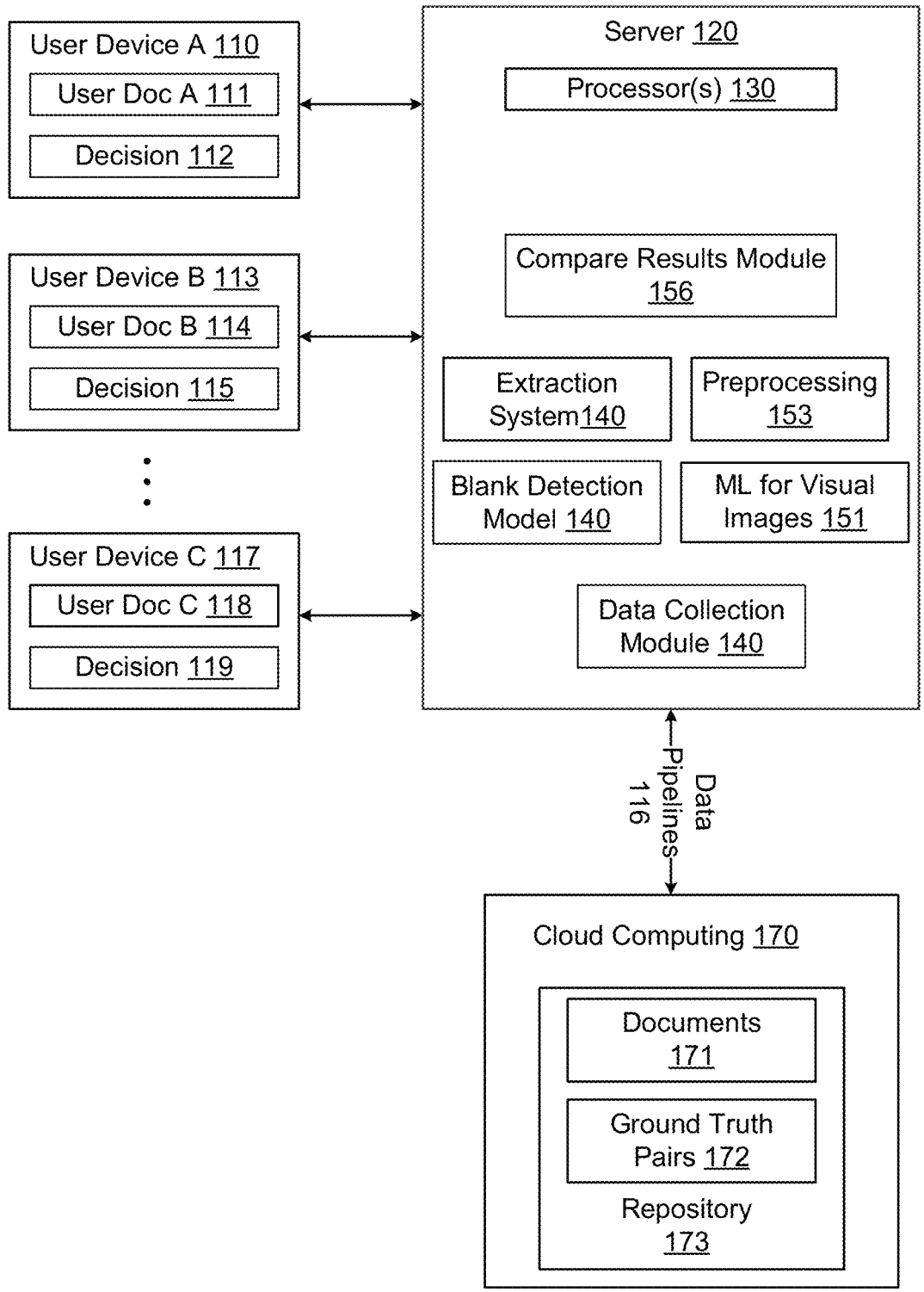
FIG. 1 and FIG. 2 show a flow diagram of a blank detection process in accordance with one or more embodiments.

Specific embodiments will now be described in detail with reference to the accompanying figures. Like elements in the various figures are denoted by like reference numerals for consistency.

In the following detailed description of embodiments, numerous specific details are set forth in order to provide a more thorough understanding of the one or more embodiments. However, it will be apparent to one of ordinary skill in the art that the one or more embodiments may be practiced without these specific details. In other instances, well-known features have not been described in detail to avoid unnecessarily complicating the description.

As used herein, the term "connected to" contemplates multiple meanings. A connection may be direct or indirect. For example, computer A may be directly connected to computer B by means of a direct communication link. Computer A may be indirectly connected to computer B by means of a common network environment to which both computers are connected. A connection may be wired or wireless. A connection may be temporary, permanent, or semi-permanent communication channel between two entities. An entity is an electronic device, not necessarily limited to a computer.

Embodiments of the disclosure solve the challenge of finding blanks in documents by using a specialized Artificial Intelligence or Machine Learning based detection system that identifies which fields in a given document are blank or not by analyzing text from the document obtained by Optical Character Recognition (OCR). The disclosure leverages training data from a collection of documents, where each field is explicitly marked as being blank or not (ground truth) by using a label and/or a confidence score. Embodiments of the disclosure involve a blank detection model being trained using a collection of documents to predict which of the fields found in the given document are blank. Further, each document of the collection of documents may include a key-value pair indicating whether at least one field in each of the collection of documents is blank.

In particular, in an embodiment, the blank detection model predicts whether at least one field is populated, while the extraction model predicts the value (if any) of that field. Finally, the system of the disclosure then compares the predictions. The two models both either indicate that a field is populated or not populated. If the predictions are inconsistent (e.g. the models give contradictory binary predictions, or inconsistent confidence scores), the user(s) are asked to review. In another embodiment of the disclosure, the results of the blank detection model are used to constrain the extraction model (e.g. assign extracted values only to fields predicted to be non-blank).

As a non-limiting example in the tax field, a W-2 form may contain numerous fields used to process tax information of an individual to complete a tax return and submit to the Internal Revenue Service (IRS). A challenge of such forms is to accurately detect which fields in a given document are left intentionally blank. To provide accuracy, increased speed, and convenience, a model to detect blanks would be able to process box 12 of the W-2 form and quickly and accurately detect that the W-2 form has a blank box 12 (for example, either not input by a user or box 12 is removed from the W-2 form so a blank would be detected). Some fields can be harder to extract or detect as blank than others. Box 12 is harder than most fields on the W-2 form to detect because the box has a tabular structure with multiple subfields. Accurately identifying blanks in documents provide a much-needed improvement to data extraction across various industries.

At a high level, embodiments of this disclosure fall under the paradigm of standard classification problems. However, the present disclosure has the advantage over the current art that the system is explicitly designed to handle blanks within a document, either at the single field level, at the multiple field level, or the entire document type using the techniques described herein.

The figures of the disclosure show diagrams of embodiments that are in accordance with the disclosure. The embodiments of the figures may be combined and may include or be included within the features and embodiments described in the other figures of the application. The features and elements of the figures are, individually and as a combination, improving the detection of blanks in documents. The various elements, systems, components, and steps shown in the figures may be omitted, repeated, combined, and/or altered as shown from the figures. Accordingly, the scope of the present disclosure should not be considered limited to the specific arrangements shown in the figures.

FIG. 1 shows a variety of system components configured to detect blanks in a document using a cloud computing system (170) connected to a server (120) by one or more data pipelines (116). The server (120) is also accessed by multiple user devices (e.g., User Device A (110), User Device B (113), and User Device C (117)), each of which is configured to upload a document (e.g., User Doc A (111), User Doc B (114), User Doc C (117)) and configured to receive as output, in the form of a decision (e.g., Decision (112), Decision (115), Decision (119)).

The server (120) includes one or more processor(s) (130), a Compare Results Module (156), an Extraction System (140), a Preprocessing module (153), a Blank Detection Model (140), a machine learning module for Visual Images (151), and a Data Collection Module (140).

The cloud computing system (170) includes Documents (171) and Ground Truth Pairs (172) (also referred to as key-value pairs) stored in a repository (173).

Figure 2:
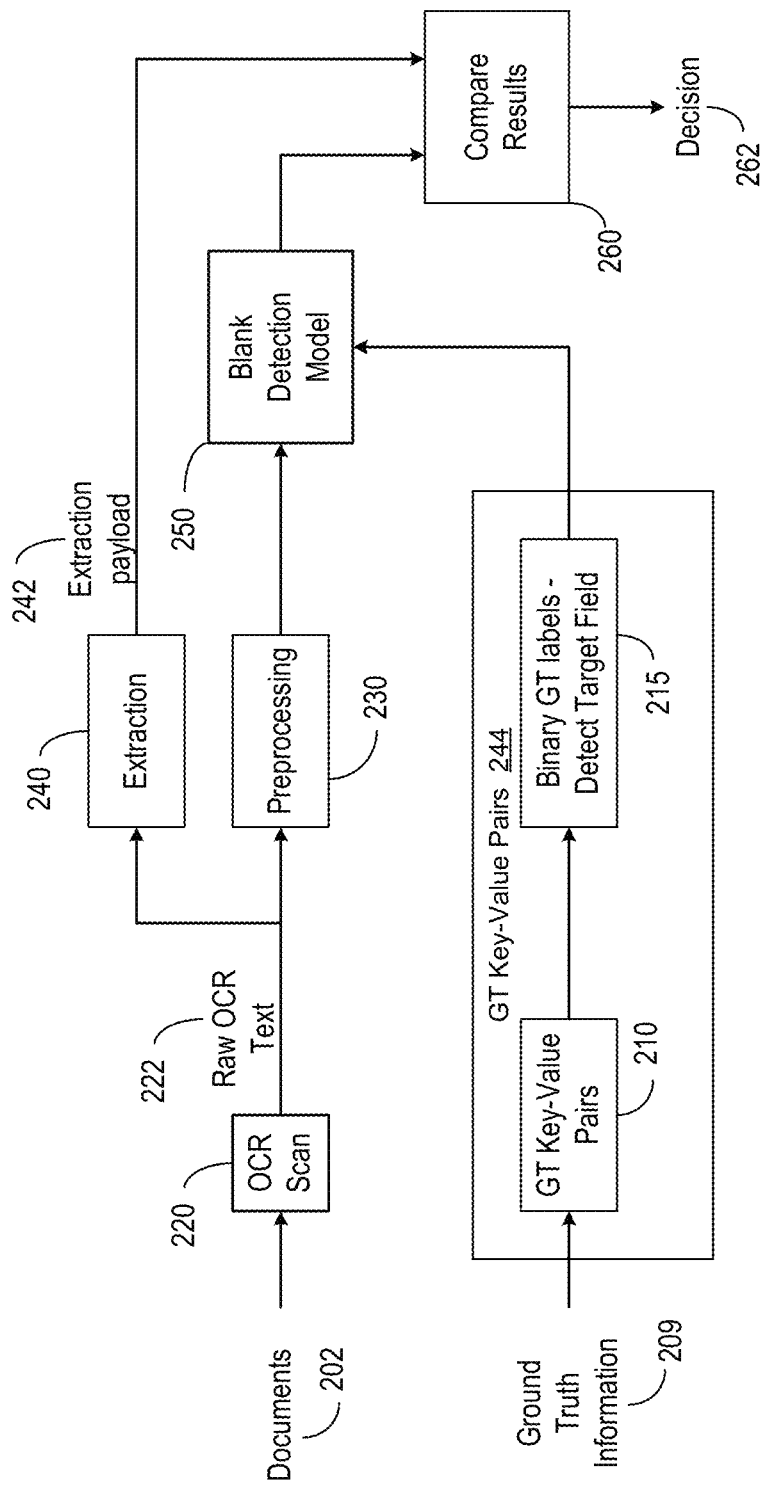

FIG. 2 shows, in accordance with an embodiment of the disclosure, a data flow diagram of the implementation of the system capable of detecting blanks in a document. In one or more embodiments, FIG. 2 may use one or more components shown and described in relation to FIG. 1.

In an embodiment of the disclosure, FIG. 2 has two diverging paths for data flow, which eventually reconverge to provide a Decision (262) as output. The first path shown in FIG. 2 is Documents (202) being provided to the OCR Scan (220) process, which outputs a raw OCR text (222) for each of the Documents (202). The raw OCR text (222) is forwarded to two different models, one for Extraction (240) and the other model for Preprocessing (230). The Extraction Payload (242) is output from the Extraction Model (240) and is then forwarded for comparison with the Blank Detection Model (250). The documents/images that were forwarded to the Preprocessing (230) now are input to the Blank Detection Model (250). In addition to the raw OCR text (222), other data may be added to the raw OCR text (222) during preprocessing (230).

In particular, in one embodiment of the disclosure, during optional preprocessing (230), a document is obtained and then OCR is performed on the document to generate payload text that is associated with coordinates (e.g., x, y space) on a page. Next, a word on the document is striped to one long string that is tokenized to replace the words with numbers. The Blank Detection Model (250) is then able to use the numbers generated during the optional preprocessing (230).

Another input to the Blank Detection Model (250) are the Ground Truth (GT) Pairs (244). The Ground Truth Pairs begin as Ground Truth Information (209). From that information, GT Key-Value Pairs (210) are formed as well as Binary GT labels (215), which indicate whether one or more fields in a document are populated. In some embodiments, the Ground Truth Pairs are used to train the Blank Detection Model.

As mentioned above, the Extraction Payload (242) and the results of the Blank Detection Model (250) are sent to the Compare Results Module (260). The Compare Result Module (260) produces a decision to convey to the user seeking accuracy regarding the detection of a blank in a document.

Figure 3:
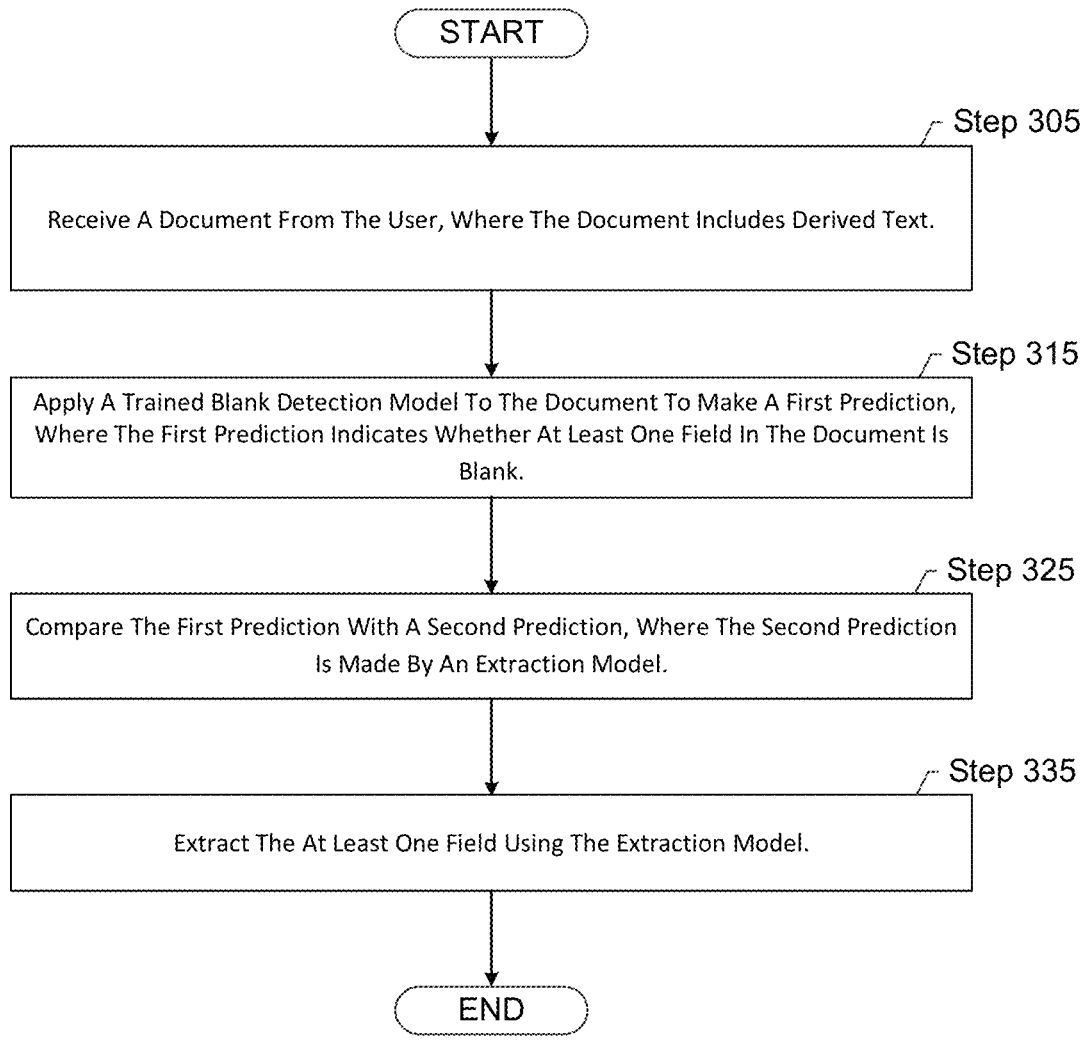
FIG. 3 shows a flowchart of a blank detection process in accordance with one or more embodiments.

FIG. 3 shows a flow chart how to perform one or more embodiments of the disclosure. At Step 305, a document or a collection of documents is received from a user where each document includes derived text (for example, via OCR). In some embodiments, labels are also received to indicate which of the fields in the document are blank. The labels may be the same as and be referred to as confidence scores indicating the likelihood of a field being blank. In some embodiments, binary labels may be accompanied by confidence scores indicating the likelihood that OCR text is correct. In one embodiment, the documents obtained include training data: a collection of documents with OCR text, along with labels indicating which of the fields in the document are blank or not.

In embodiments of the disclosure a machine learning (ML) system (e.g., the blank detection model) is trained to predict which fields are blank. Given the training data, the machine learning system is trained to predict which fields are blank. The ML system is based on a generic Natural Language Processing (NLP) base system—for e.g., a transformer-based system like Bi-directional Encoder Representations from Transformers (BERT). The ML system may be extended to leverage more powerful modeling schemes that take advantage of visual information in a document (like LayoutLM and its variants). Finally, the ML system may be constructed as a multi-label model that gives multiple predictions, one for each field.

At Step 315, a trained blank detection model is applied to the document to make a first prediction, where the first prediction indicates whether at least one field in the document is blank. In some embodiments, the first prediction may include a confidence score indicating a likelihood that the at least one field is blank. In some embodiments, the first prediction is based on comparing a confidence score with a threshold (for example, the at least one field is predicted to be blank if the confidence score exceeds or falls below a threshold).

In embodiments of the disclosure, the blank detection model is combined with an extraction model used to extract one or more non-blank fields in the document. In an embodiment of the disclosure, the blank detection model that is capable of detecting blanks in a document described above and shown in FIG. 2 is combined with any other extraction system used to extract the non-blank fields in the document. Example of use cases for this combination approach may apply to Box 12 of the W-2 tax form shown and described in relation to FIG. 4. Below are steps outlining how the combination approach could be performed in embodiments of the disclosure:

Applying the blank detection model to one box—is box 12 populated or blank?

Extracting key-value pairs from the entire document—are any from box 12 of the W-2 form?

If the answers to (a) and (b) are different, presenting the extracted values to the user for review and to provide a decision.

This combination of the blank detection model and the extraction model may be done in a binary fashion, where blanks are first detected, and then only fields outside the detected blanks are selected from the non-blank extractor. Or if confidence scores are available, the combination can be done in a "soft" fashion where confidence scores are observed from the blank and non-blank extractor and compared, to decide which prediction to keep if the two extractors are in disagreement. Interestingly, blank detection and extraction may occur in series or in parallel. If the steps occur in series, the results of blank detection may be used to guide/constrain assigning extracted values to fields. If a prediction that one field is blank is made with some confidence, assigning any extracted value to that field can be penalized, where the penalty is proportional to the confidence.

At Step 325, in one embodiment of the disclosure, the ML system compares the first prediction with a second prediction, where the second prediction is made by an extraction model. At 335, the at least one field is extracted using the extraction model and the decision of blanks fields that are found in documents is presented to the user(s).

Figure 4:
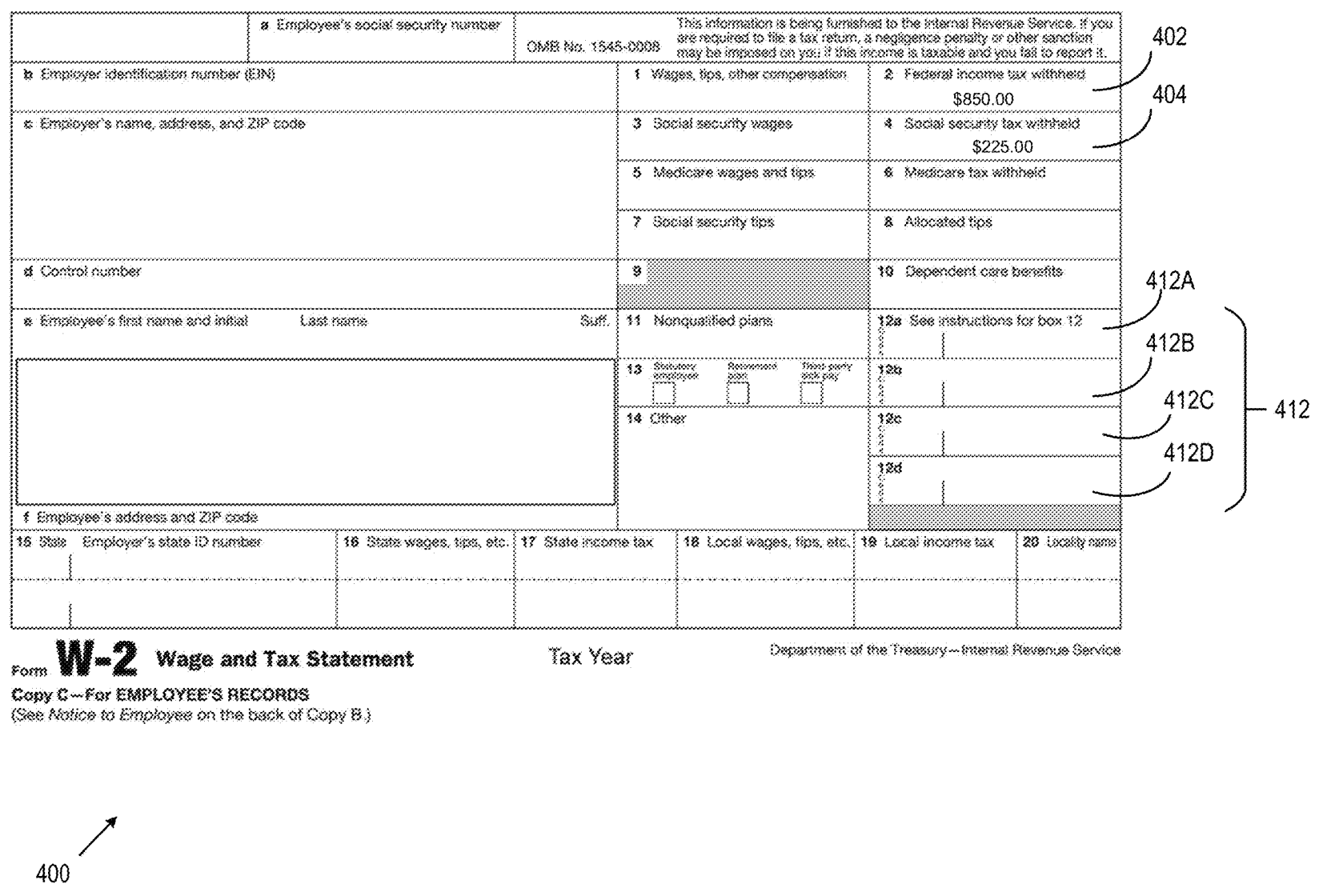

FIG. 4 shows a non-limiting example of the systems referenced in FIG. 1, FIG. 2, and FIG. 3. A commonly formatted W-2 Wage and Tax Statement form from the Internal Revenue Service (IRS) in the U.S. is shown. Although a W-2 form takes a relatively constant form, the disclosure described above is able to find blanks on a document if the order is changed, a particular box is not completed, or if a particular box is removed (either intentionally or unintentionally) from the document.

Several boxes on the W-2 form are identified, including, Box 2 Federal Income Tax Withheld (402), and Box 4 Social Security Tax Withheld, which include dollar amounts, so those individual fields would not be identified as blank.

Upon encountering Box 12 (e.g., 412A, 412B, 412C, 412D), all the boxes within Box 12 are blank. Accordingly, the blank detection model and the system described and shown in FIG. 3 will identify Box 12 as blank, but not identify Box 2 and Box 4, as blank.

Figure 5A:
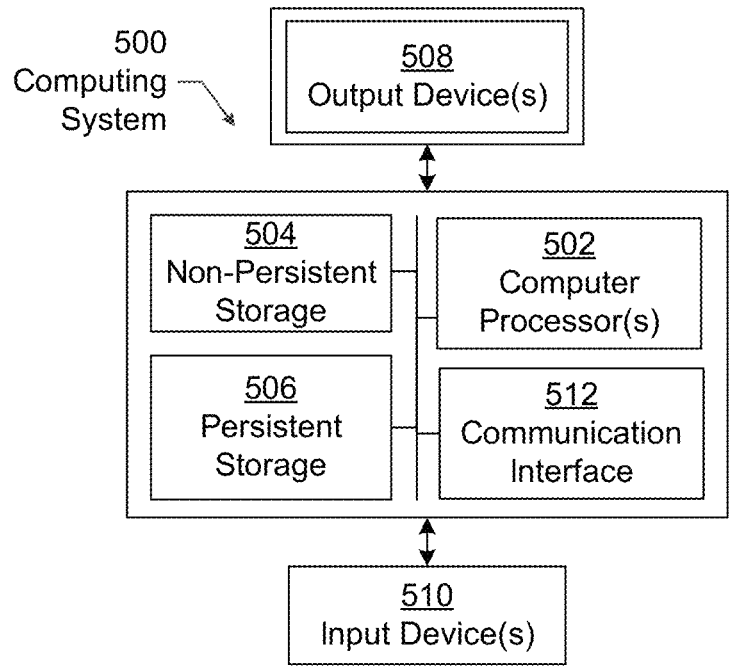
FIG. 5A and FIG. 5B show a flow diagram of computing systems in accordance with one or more embodiments.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5A, the computing system (500) may include one or more computer processors (502), non-persistent storage (504), persistent storage (506), a communication interface (512) (e.g., Bluetooth interface, infrared interface, network interface, optical interface, etc.), and numerous other elements and functionalities that implement the features and elements of the disclosure. The computing system (500) may execute within and use resources of the cloud computing environment.

The computer processor(s) (502) may be an integrated circuit for processing instructions. The computer processor(s) may be one or more cores or micro-cores of a processor. The computer processor(s) (502) includes one or more processors. The one or more processors may include a central processing unit (CPU), a graphics processing unit (GPU), a tensor processing unit (TPU), combinations thereof, etc.

The input device(s) (510) may include a touchscreen, keyboard, mouse, microphone, touchpad, electronic pen, or any other type of input device. The input device(s) (510) may receive inputs from a user that are responsive to data and messages presented by the output device(s) (508). The inputs may include text input, audio input, video input, etc., which may be processed and transmitted by the computing system (500) in accordance with the disclosure. The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the output device(s) (508) may include a display device, a printer, external storage, or any other output device. One or more of the output devices may be the same or different from the input device(s). The input and output device(s) may be locally or remotely connected to the computer processor(s) (502). Many different types of computing systems exist, and the aforementioned input and output device(s) may take other forms. The output device(s) (508) may display data and messages that are transmitted and received by the computing system (500). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure, which may include transmitting, receiving, presenting, and displaying data and messages described in the other figures of the disclosure.

Figure 5B:
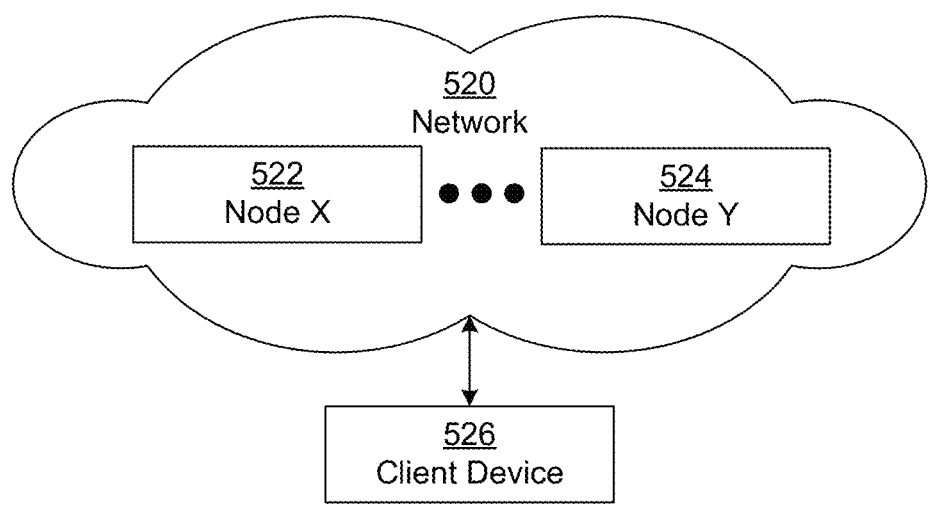

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (500) may be located at a remote location and connected to the other elements over a network.

The nodes (e.g., node X (522), node Y (524)) in the network (520) may be configured to provide services for a client device (526), including receiving requests and transmitting responses to the client device (526). For example, the nodes may be part of a cloud computing system. The client device (526) may be a computing system, such as the computing system shown in FIG. 5A. Further, the client device (526) may include and/or perform all or a portion of one or more embodiments of the disclosure.

The computing system of FIG. 5A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

In the above description, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description. Further, other embodiments not explicitly described above can be devised which do not depart from the scope of the disclosure as disclosed herein. Accordingly, the scope of the disclosure should be limited only by the attached claims.

What is claimed is:

1. A method of blank detection, the method comprising:
   receiving a document from a user, wherein the document comprises derived text;
   applying a trained blank detection model to the document to make a first prediction, wherein the first prediction indicates whether at least one field in the document is blank;
   applying a trained extraction model to the at least one field in the document to make a second prediction, wherein the second prediction indicates a value of the at least one field;
   comparing the first prediction with the second prediction; and
   processing the at least one field depending on a result of comparing the first prediction with the second prediction.

2. The method of claim 1, wherein the trained blank detection model is trained, using a collection of documents, to predict which of the at least one field found in the collection of documents are blank.

3. The method of claim 1,
   wherein the trained blank detection model is trained using a collection of documents, and
   wherein each document of the collection of documents comprises a key-value pair indicating whether the at least one field in each of the collection of documents is blank.

4. The method of claim 1, wherein the first prediction comprises a confidence score.

5. The method of claim 4, further comprising:
   determining the confidence score, wherein the confidence score indicates a likelihood that the at least one field is blank.

6. The method of claim 1, further comprising:
   wherein comparing indicates that the first prediction and the second prediction both indicate that the at least one field includes one or more non-blank fields found in the document,
   presenting, responsive to both the first prediction and the second prediction both indicating that the at least one field includes one or more non-blank fields, the one or more non-blank fields found in the document.

7. The method of claim 1, wherein the trained blank detection model executes in parallel with the trained extraction model or in series with the trained extraction model.

8. The method of claim 1, wherein both the trained extraction model and the trained blank detection model indicate that the at least one field is not blank, and wherein the processing further comprises:
   extracting, using the trained extraction model and responsive to the trained blank detection model determining that the at least one field is not blank, a value of the at least one field.

9. The method of claim 1, wherein one of the trained extraction model and the trained blank detection model indicates that the at least one field is blank, and the other of the trained extraction model and the trained blank model indicates that the at least one field is not blank, and wherein the processing further comprises:
   transmitting the document to a user with a request to review the document.

10. The method of claim 1, wherein both the trained extraction model and the trained blank detection model indicate that the at least one field is blank, and wherein the processing further comprises:
    identifying that the at least one field is blank.

11. The method of claim 1, further comprising:
    constraining the trained extraction model by assigning extracted values to the at least one field only when the trained blank detection model indicates that the at least one field is blank.

12. A system for blank detection, the system comprising:
    a user device configured to store:
       a collection of one or more documents comprising at least one field, wherein the one or more documents are from a user;
    a cloud computing system configured to provide access to a repository storing the one or more documents; and
    a server communicatively connected to the cloud computing system and comprising one or more processors configured to execute instructions to:
       receive a document, wherein the document comprises derived text;

apply a trained blank detection model to the document to make a first prediction, wherein the first prediction indicates whether the at least one field in the document is blank;

apply a trained extraction model to the at least one field in the document to make a second prediction, wherein the second prediction indicates a value of the at least one field;

compare the first prediction with the second prediction; and process the at least one field depending on a result of comparing the first prediction with the second prediction.

13. The system of claim 12, wherein the trained blank detection model is trained, using the collection of documents, to predict which at least one field found in the collection of documents are blank.

14. The system of claim 12, wherein the trained blank detection model is further configured to execute instructions to determine a confidence score, wherein the confidence score indicates a likelihood that the at least one field is blank in the collection of one or more documents.

15. The system of claim 12, wherein the trained blank detection model comprises a bidirectional encoder representations from transformers (BERT) language representation model.

16. The system of claim 12, wherein the derived text comprises output of an optical character recognition (OCR) scanning operation.

17. The system of claim 12, wherein the trained blank detection model executes in parallel with the trained extraction model or in series with the trained extraction model.

18. A non-transitory computer-readable medium storing instructions executable by a processor to:

receive a document from a user, wherein the document comprises derived text;

apply a trained blank detection model to the document to make a first prediction, wherein the first prediction indicates whether at least one field in the document is blank;

apply a trained extraction model to the at least one field in the document to make a second prediction, wherein the second prediction indicates a value of the at least one field;

compare the first prediction with the second prediction; and process the at least one field depending on a result of comparing the first prediction with the second prediction.

19. The non-transitory computer-readable medium of claim 18, further comprising presenting one or more non-blank fields found in the document.

20. The non-transitory computer-readable medium of claim 18, wherein the trained blank detection model executes in parallel with the trained extraction model or in series with the trained extraction model.

* * * * *